WRITE-IN (AND GATE)

OR GATE

DIRECTIONAL PROPAGATION
(FIELD CONTROLLED)

DIRECTIONAL PROPAGATION
(CONTROLLED BY TIP INTERACTION)

INVENTOR
ROBERT J. SPAIN
BY
Weingarten, Arenbuch & Lahive
ATTORNEYS

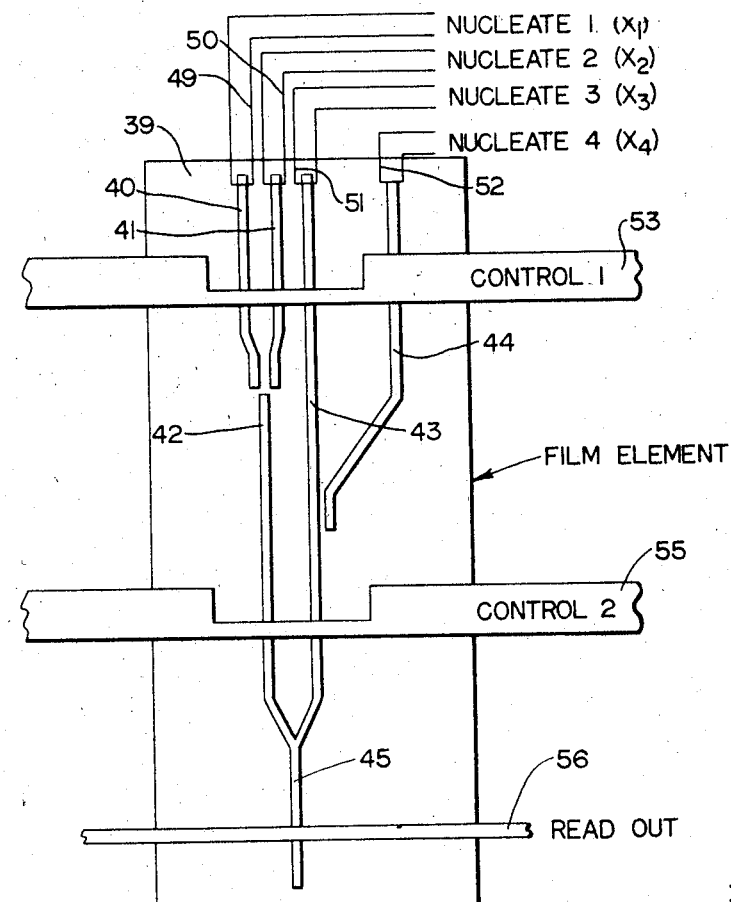
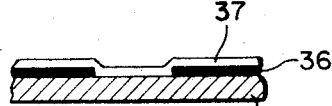
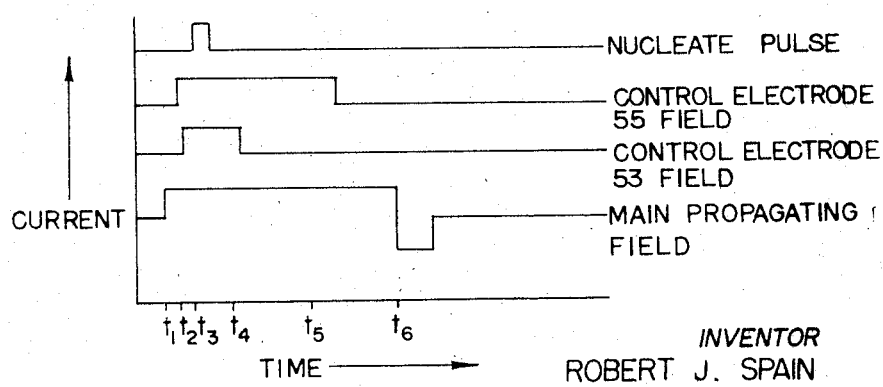
FIG. 8
FIG. 7
FIG. 9
INVENTOR
ROBERT J. SPAIN

United States Patent Office 3,438,006
Patented Apr. 8, 1969

3,438,006
DOMAIN TIP PROPAGATION LOGIC
Robert J. Spain, Brighton, Mass., assignor, by mesne assignments, to Cambridge Memory Systems, Inc., Farmington, Mass., a corporation of Massachusetts
Filed Jan. 12, 1966, Ser. No. 520,195
Int. Cl. G11b 5/00
U.S. Cl. 340—174                                      6 Claims This invention relates in general to magnetically controlled logical operations and more particularly to a logical system utilizing the field reversing characteristics of thin magnetic film prepared in particular configurations.

In the past, the utilization of thin magnetic films to construct a variety of logical elements to perform magnetic logical operations has been proposed. In general, these proposals have suggested logical elements using either one of two field reversing mechanisms. One technique would utilize interaction between domain walls. The other technique employed a number of discrete film elements in which magnetic reversal would take place coherently over the entire element and in which the logical operation would depend upon the interaction between adjacent elements. One drawback to the construction of such elements lies in the weakness of the stray field associated with them. Typically, the effective field of interaction between domain walls is the order of a fraction of an oersted. This weakness is presumably due to the fact that the net "magnetic charge" of the wall is zero and hence the stray field from the wall is essentially dipolar and therefore diminishes very rapidly as a function of separation from the wall. Another limitation of a logical operational system utilizing domain wall motion is the relatve slowness of field reversal by this mechanism. Thus, lateral wall mobility is generally in the order of $5 \times 10_3$ cms. per second per oersted. Simiarly, the stray field associated with the coherent switching of a small discrete element is also very small. Thus, in this latter case, while high speeds may be obtained, the field associated with the switching of the element is insufficient for stable interaction with another element to perform a logical operation.

It is, therefore, the primary object of the present invention to provide an all magnetic logic plane for performing logical operations reliably at high speed.

It is another object of the present invention to provide a thin magnetic film logic plane capable of performing any one of a variety of logical operations at high speeds.

Broadly speaking, the logic plane of the present invention is constructed of a thin ferromagnetic film, magnetically anisotropic, and the logical operations result from the propagation of a domain of reversed magnetization along a low coercive force channel positioned with respect to another low coercive force channel such that the propagation of the magnetic domain in the first channel affects the state of the magnetization in the second channel. The mode of magnetization reversal employed is referred to as "domain tip propagation." In this particular mode of switching, a small lenticular shaped domain of reversed magnetization is caused to propagate along the long axis of the lentil by the application of an intermediate magnitude switching field, in a direction opposite to the initial magnetization direction of the film. The domain tip propagation attains speeds significantly higher than those obtainable with lateral wall traversal, typically in the order of $5 \times 10^5$ centimeters per second. While the theory of the mechanisms governing this type of domain propagation is at present incomplete, a relatively extensive discussion of the phenomenon may be found in an article of the Journal of Applied Physics, volume 33, No. 4, April 1962, entitled "Non-Coherent Switching in Permalloy Film" by D. O. Smith and K. J. Harte.

Domain tip propagation exhibits several properties which render it particularly suitable for operation of magnetic logic elements. Thus, the speed of propagation of this mode, as indicated above, is an order of magnitude faster than domain wall traversal. Additionally, the direction of propagation of the domain tip is dependent upon the direction of the applied field which causes propagation of the tip. Lastly, the effective field of interaction between domain tips is significantly larger than that peculiar to interaction between domain walls and the net magnetic charge at the domain tip is positive or negative depending upon the direction of propagation of the domain tip. Control of the growth of the domain tip is thus achieved by preparing, in a magnetic film material, narrow channels of lower coercive force than the remainder of the film so that, under the influence of a suitable applied field, growth of the domain by lateral wall motion will be inhibited permitting the growth from the tip of the domain. Under these conditions, fields may be applied which cause propagation of the domain tip within the channels without affecting the state of magnetization of the general film material. Additionally, the presence of this magnetic material will prevent the nucleation of extraneous domains within the channels over a sufficiently wide range of applied fields. By appropriately positioning the channels with respect to one another and by applying suitably oriented fields, the propagation of a domain tip along one channel can be used either to nucleate a new domain tip in an adjacent channel or to affect the direction of propagation of a domain tip in an adjacent forked channel.

Other objects and advantages will become apparent from the following detailed description when taken in conjunction with the accompanying drawings in which:

FIG. 6 is an illustration in diagrammatic form of an inhibiting gate constructed in accordance with the principles of this invention;

FIG. 7 is a cross-sectional view of a low coercive force channel formed in a high coercive force magnetic medium;

FIG. 8 is an illustration in diagrammatic form of a logical system constructed in accordance with the principles of this invention; and FIG. 9 is a chart indicating the time sequence of actuation of elements of the system illustrated in FIG. 8.

Figure 1:
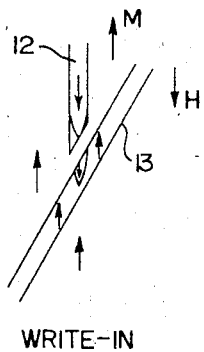
FIG. 1 is an illustration in diagrammatic form of a write-in logical element constructed in accordance with the principles of this invention.

With reference now to FIG. 1, there is shown a pattern of low coercive force magnetic channels within a high coercive force magnetic medium forming a write-in logical element. The magnetic medium has an easy axis of magnetization parallel to the arrow designated M. The film is initially magnetized in a direction as indicated by the head of the arrow M. A reversing field, as indicated by the arrow H is applied to the magnetic film and the intensity of this field is sufficient to propagate an existing tip domain in a low coercive force channel, but insufficient to nucleate a domain in such a channel. If a domain of reversed magnetization has previously been nucleated in channel 12, then the propagation of this domain to a position at the end of this channel adjacent to the diagonal channel 13, results in a sufficiently strong field within channel 13 to nucleate a new domain of reversed magnetization. Accordingly, the presence or absence of a domain tip within channel 12, at the time of application of a field opposing the easy axis magnetized field, controls whether or not a domain of reversed magnetization is written in to the diagonal channel 13. A simple inductive pick up such as a coil or wire can be used to provide an output signal which depends upon the presence or absence of this domain in channel 13. The field strength required for nucleation of a domain within a narrow channel (for example, 3 mils wide) is approximately 10 oersteds in a film of 75% nickel, 16% iron, 9% cobalt, while the propagation field for the same channel is in the order of 2½ to 3 oersteds. The stray field associated with a domain tip is in the order of three to four oersteds at a distance of 3 mils from the center of charge of the domain tip. Accordingly, if channels 12 and 13 are spaced apart 1 mil and if an easy axis magnetic field of approximately 7 to 8 oersteds is applied to the element of FIG. 1, then the presence of a domain tip, previously nucleated, in channel 12 will control the write-in of a domain tip into channel 13.

Figure 2:
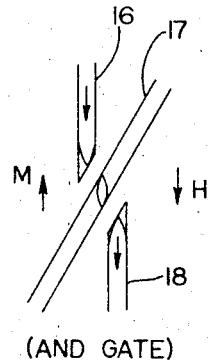
FIG. 2 is an illustration in diagrammatic form of an AND gate constructed in accordance with the principles of this invention.

In FIG. 2 there is shown a configuration of three low coercive force channels 16, 17 and 18 with channels 16 and 18 generally parallel to the easy axis of magnetization, while channel 17 runs diagonally across the easy axis of magnetization between the ends of channels 16 and 18. This configuration provides an AND gate in that the presence of a reverse magnetization domain at the end of channel 16, in conjunction with the presence of a similar domain at the end of channel 18, provides a sufficient increase in field opposing the initial magnetization state within channel 17 to control the nucleation of a new domain within that channel. Thus, by the propagation of existing domains in channels 16 and 18 or the nucleation of domains coupled with a propagating field, the logical operation of an AND gate is obtained. The propagating fields may be generated by suitably formed conductors which underlie, overlie or are wrapped around the thin film element. If the conductors are formed with varying size portions, then a strong field may be created only in a localized area, thereby providing a nucleating or propagating field only in the channel adjacent to this portion of the conductor.

Figure 3:
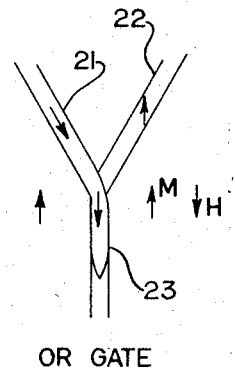
FIG. 3 is an illustration in diagrammatic form of an OR gate constructed in accordance with the principles of this invention.

In FIG. 3 there is shown an OR gate in which two input channels 21 and 22 join to form a single output channel 23. Under the influence of an easy axis field a tip domain in either channel 21 or channel 22 will result in the propagation of a reversed domain state in channel 23.

Figure 4:
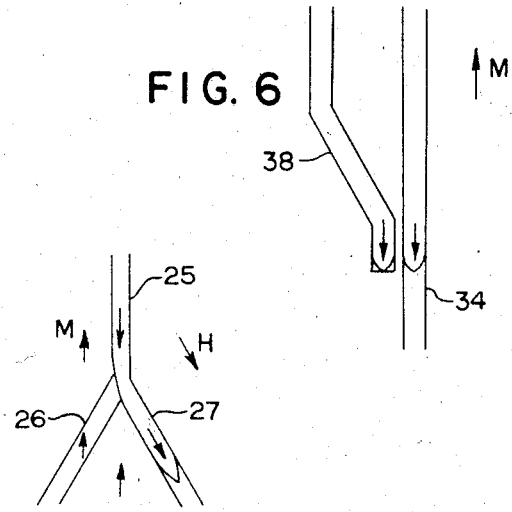
FIG. 4 is an illustration in diagrammatic form of one embodiment of a directional gate constructed in accordance with the principles of this invention.
Figure 5:
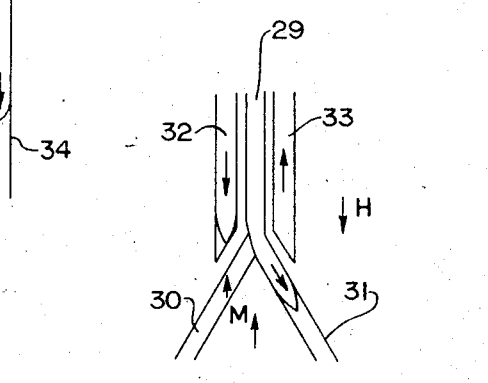
FIG. 5 is an illustration in diagrammatic form of a second embodiment of a directional gate constructed in accordance with the principles of this invention.

FIGS. 4 and 5 show two different configurations of directional gating switches in which the directional properties of the magnetization or the attractive and repelling properties of the domain are used to channel a propagated domain of reversed magnetization into one or the other of two forked channels. Thus, turning to FIG. 4, an input channel 25 is bifurcated into channels 26 and 27. If a domain of reversed magnetization is propagated along channel 25, then the choice of which of the two branches, 26 or 27, the domain is continued along depends upon the direction of the hard axis field. If the propagating field is, as indicated, applied at an angle to the right of the easy axis of magnetization, then the domain of reversed magnetization is propagated along channel 27. Conversely, if the propagating field were applied at an angle to the left from the easy axis of magnetization then the domain would be propagated along channel 26.

A second embodiment of a switching gate is shown in FIG. 5. In this embodiment an input channel 29 is again branched into a pair of output channels 30 and 31. In addition, a pair of control channels 32 and 33 are placed on either side of the input channel 29 and extend just beyond the point of intersection between the input channel 29 and the branched output channels 30 and 31. If now a propagating field is applied parallel to the easy axis, then the determination of the branch along which a domain of reversed magnization will be propogated from input channel 29 is controlled by the magnetization states within channels 32 and 33. Since domains of reversed magnetization propagated in the same direction have the same magnetic charge, they tend to repel one another and accordingly the presence of a domain of reversed magnetization in the left control channel 32 will deflect the reversed magnetic domain propagated along channel 29 into the branch 31 on the right.

In FIG. 6 there is shown a configuration which forms an inhibiting gate. In this arrangement the continued propagation of a domain of reversed magnetization along a channel 34 is controlled by the state of magnetization in the end of the adjoining control channel 38. Since domain tips which propagate in the same general direction repel one another, then if a domain of reversed magnetization is generated in the end of channel 38, and another domain tip is subsequently propagated down channel 34, the domain tip within channel 34 will stop propagating. In order to achieve this effect, the propagation drive field must be, of course, at a value such that the effect of the stray field in the adjoining channel decreases the net reversing field applied to the adjacent area of channel 34 below a value sufficient for propagation. Other configurations may be employed to achieve the same effect.

There are a number of different techniques which may be utilized to provide for low coercive force channels within a thin magnetic film. These techniques include, for example, various types of cleaning procedures for preparing the film substrates, substrate roughening, the application of mechanical stresses, annealing treatments, chemical etching of the film surface and evaporation of different materials prior to the deposition of the magnetic film itself. In FIG. 7 there is shown a cross-sectional view of a low coercive force channel in a high coercive force magnetic medium in which the last-mentioned technique has been employed. This channel was constructed by evaporating onto a glass substrate 35 an aluminum film and subsequently removing, by etching, the aluminum in the area of the channel. The glass substrate 35 is then left coated with an aluminum layer 36 only on those areas outside of the proposed low coercive force channel. Finally, a magnetic film, such as a mixture of 80% nickel, 17% iron and 3% cobalt, is evaporated over the aluminum and glass. The magnetic film 37 will then exhibit a high coercive force characteristic except in the area within the channel which has no underlayer of aluminum.

A specific procedure for preparing magnetic films of this type is as follows. A substrate of glass is ultrasonically cleaned and an aluminum layer approximately 500 A. thick is then evaporated onto the substrate which is held at a temperature of 200° C. This temperature is necessary in order that the increase in coercive force of the permalloy film is sufficient for operation of the logical elements. Next the aluminum is coated with a photoresistive material such as Kodak Photo Resist and, after drying and baking, it is exposed to an ultraviolet light source through a suitable mask bearing a channel pattern as illustrated in FIG. 1. After developing and baking, the substrate is placed in phosphoric acid and the aluminum etched away in the regions which were masked by the channel configuration during the exposure of the KPR. The exposed KPR must then be stripped from the aluminum and the substrate is again ultrasonically cleaned. The final step is the deposition of a 1500 A. film formed of 80% nickel, 17% iron and 3% cobalt upon the entire substrate at a temperature of 200° C. An easy anisotropic axis is induced parallel to the long dimension of channel 12 in FIG. 1. A typical method for accomplishing this is evaporation of the magnetic film in the presence of a magnetic field.

A number of logic elements of the type generally described above may be constructed in a single magnetic film to provide a complete logical system. In addition to the logical interactions previously described, modifying techniques may be employed to either inhibit the operation of logical elements or to delay its operation. One such technique is the use of a strip conductor positioned with respect to an element so that passing a current in the proper direction through the conductor generates a field opposing the normal applied propagating field. As long as this field is maintained, it either prevents or delays the propagation depending upon the strength of the field created. The channels also may be formed with narrower or thicker portions and, since the coercive force within the channel is increased by narrowing the channel, the narrowed portions of the channel provide a delay in propagation of the reversed domain. When strip conductors are placed adjacent to the narrowed portions of the channel, the delay can be controlled by applying an aiding field in the direction of the propagating field to overcome the higher coercivity of the narrowed portion or by applying a field opposing the propagating field in that same region to completely inhibit propagation.

Turning now to FIG. 8, there is shown such a logical system in which the output signal is equal to $$x_1 \cdot x_2 + x_3 \cdot \overline{x}_4$$

In the device illustrated in FIG. 8, a thin magnetic film 39 has an easy axis of magnetization parallel with the arrow designated M and this film is initially magnetized in the direction M. A first pair of low coercive force channels 40 and 41 are positioned in the film 39 to extend generally parallel to the easy axis and terminate at the same longitudinal point in the film. A third low coercive force channel 42 begins closely adjacent to this termination point of channels 40 and 41 and continues along the direction of the easy axis, the three channels 40, 41 and 42 forming an appropriate channel layout for an AND gate. An overall propagating field is applied to the magnetic film element 30 by means, typically, of a coil (not shown) wrapped around the entire element to create a field parallel to, but opposite in direction to, the initial magnetization of the element. Domains of reversed magnetization may be introduced into the upper ends of channels 40 and 41 by nucleating electrodes 49 and 50, respectively, which are formed of wires passed over the ends of the respective channels. Sufficient current is passed through the wires in appropriate time sequence to nucleate a small domain of reversed magnetization in these ends.

The magnetic element 39 also includes another pair of low coercive channels 43 and 44, with channel 43 extending parallel to the easy axis of magnetization and joining the lower end of channel 42 to form an output channel 45. Channel 44 begins at the same longitudinal point as channels 40, 41 and 43 and extends parallel to but spaced apart from these three channels. This channel then is bent inwardly toward channel 43 and comes into close proximity with channel 43 at a point which is longitudinally positioned below the beginning of channel 42. Channels 43 and 44 are provided with nucleating conductors 51 and 52, respectively. In terms of the logical operation to be performed, conductor 49 is actuated by a current corresponding to the quantity $x_1$, conductor 50 is actuated by a current corresponding to the quantity $x_2$, conductor 51 is actuated by a current corresponding to the quantity $x_3$ and conductor 52 is actuated by a current corresponding to the quantity $x_4$. In addition to the above components, the logical system of FIG. 8 includes a first strip control conductor 53 and a second strip control conductor 55 as well as a readout conductor 56. The first control conductor 53 is arranged to have a narrow portion for creating an intense field which overlies only channels 40, 41 and 43 while the second control conductor 55 includes a narrow portion for creating an intense field which overlies only channels 42 and 43.

As previoulsy mentioned, channels 40, 41 and 42 together with appropriately sequenced and applied fields, form an AND gate such that a domain of reversed magnetization propagated along channel 42 represents a positive input applied to both channels 40 and 41 and therefore can be represented as $x_1 \cdot x_2$. The arrangement of channels 43 and 44 is such that a domain of reversed magnetization introduced into channel 43 will be propagated along the length of 43 up to channel 45 only if there is no domain of reversed magnetization located at the end of channel 44 adjacent to channel 43. In the case where there is such a domain of reversed magnetization, the stray field from this domain acts as an inhibitor against propagation of the domain of reversed magnetization along channel 43. These two channels may then be considered as a logical inversion element providing an output to channel 45 equal to $x_3 \cdot \overline{x}_4$ where $x_3$ and $x_4$ control the state of nucleation at the inputs to channels 43 and 44, respectively. Since the two channels 43 and 42 merge to form the output channel 45, the last logical operation in the overall magnetic system 39 is an OR gate and hence the total output of channel 45 represents the summation of the two products.

The appropriate pulse sequence for operation of the logical system of FIG. 8 is illustrated in FIG. 9. At time $t_1$ the main drive current is applied to a suitable conductor (not shown) to produce the general propagating field parallel to and opposite in direction to the initial state of magnetization to the film. At time $t_2$ current is applied to both control conductors 53 and 55 in a direction to create a field opposing the main propagation field and thus inhibit the passage of any tip domain in those channel areas which underlie the narrowed portion of these control conductors. At time $t_3$, which is delayed for a sufficient period after $t_2$ to insure that the control fields have been generated, the $x_i$ inputs are introduced by a nucleating pulse in those inputs in which a positive $x_i$ is to be generated. At time $t_4$, the current through the control conductor 53 is cut off enabling the logic operation to be performed at the AND gate formed by channels 40, 41 and 42 and the invention operation to be performed at the point where channel 44 is adjacent to channel 43. It should be noted that, since channel 44 passes under a broad area of the control electrode 53, a tip domain nucleated within this channel is not inhibited by the activation of control conductor 53 and hence any domain nucleated in this channel will already have reached the end of this channel before the propagation of the tip domain along the adjacent 43. The time delay between time $t_3$ and $t_4$ is made sufficiently long so that a domain tip nucleated at the beginning of any one of the channels will have propagated under the influence of the propagating field at least up to the point where the control conductor 53 overlies the channel. This requirement insures that the inhibiting fields generated by control conductor 53 will in fact delay the propagating of tip domains within the channels underlying the narrow portions of this conductor.

At time $t_4$, the inhibiting field generated in the area underlying control conductor 53 is removed and domains of reversed magnetization within channels 40, 41 and 43 will be propagated under the influence of the main propagating field down these channels. The logical operations then take place at the appropriate point with respect to the AND gate formed by channels 40, 41 and 42 and the inversion gate formed by channels 44 and 43. During this time, the control conductor 55 has, of course, been actuated since it was initially actuated coincident with the actuation of control conductor 53. The energization of control conductor 55 is stopped at time $t_5$ thus removing the inhibiting field created by it. As in the instance of control conductor 53, the elapsed time between $t_4$ and $t_5$ is arranged to be sufficiently long so that control conductor 55 actually inhibits and delays the passage of domains of reversed magnetization in channels 42 and 43. When the actuation of control conductor 55 ceases at time $t_5$, then the domains of reversed magnetization within these two channels continue to be propagated under the influence of the main propagation field through the intersection between these channels and into the output channel 45. The readout conductor 56 is positioned with respect to channel 45 to sense the passage of a domain tip through this channel. Typically, this conductor 56 could be a simple inductive pickup such as a coil or length of wire. At time $t_6$, the main drive field propagating the domains of reversed magnetization is removed and a current of opposite polarity is applied to the main propagating drive conductor to restore the entire logic plane element to the initial state of magnetization.

It has been found that with an appropriate logic plane formed with a 1500 A. 75/16/9 NiFeCo film deposited over an aluminum base in accordance with the procedure described earlier, a propagating field of eight oersteds may be used in a system such as that illustrated in FIG. 8. In this instance, a control field of seven oersteds, nucleating fields of twelve oersteds and a restoring field of fifteen oersteds have been found suitable.

While the invention has been described above in terms of a number of specific logical arrangements, it is apparent that the same principles may be employed to develop a number of logical systems. Again this system has been described in terms of channels within the same plane; however, channels may be formed in horizontal planes which are then placed in close vertical juxtaposition, thereby effecting logical operation along a vertical as well as horizontal coordinates.

The invention having been described, various modifications and improvements will now occur to those skilled in the art and the invention described herein should be construed as limited only by the spirit and scope of the appended claims.

What is claimed is:

1. A magnetic logical element comprising, a magnetic medium, a first channel within said magnetic medium, said first channel being defined as an integral area characterized by a substantially lower coercive force than the remainder of said medium, a second channel within said medium, said second channel being defined as a second integral area characterized by a lower coercive force than said medium, and means for applying a magnetic field to said first channel to effect the state of magnetization within said first channel, said second channel being positioned with respect to said first channel such that the state of magnetization within said second channel is affected by the state of magnetization within said first channel.

2. A magnetic logical element comprising, a magnetic medium, first, second, and third channels disposed within said magnetic medium, each of said first, second and third channels being formed as an independent integral area exhibiting a substantially lower coercive force characteristic than said medium, means for applying a magnetizing field to said first and said second channels, said first, second and third channels being positioned with respect to one another such that the direction of magnetization within said first and second channels effects the direction of magnetization within said third channel.

3. A magnetic logical element comprising, a magnetic medium initially magnetized in a first direction, first, second and third channels located within said magnetic medium, each of said channels being defined as an area characterized by substantially lower coercive force than said medium, each of said first, second and third channels intersecting at a common point, means for nucleating a domain of reversed magnetization within either one of said first or second channels and means for applying a magnetic field to said first and said second channels, said applied magnetic field being in a direction opposed to the direction of said initial magnetization and of sufficient strength to propagate any domain of reversed magnetization within said first or said second channel into said third channel.

4. A magnetic logical element comprising, a magnetic medium initially magnetized in a first direction, first, second and third channels located within said magnetic medium, each of said channels being defined as an area exhibiting a substantially lower coercive force characteristic than said medium, each of said channels intersecting at a common point, means for nucleating within said first channel a domain of magnetization reversed in direction from the direction of said initial magnetization, and means for applying a magnetic field to said magnetic medium, said magnetic field having at least one component opposite in direction to the direction of said initial magnetization, and exhibiting sufficient intensity to propagate said reversed domain of magnetization into one or the other of said second and third channels, the selection of said second or third channels being determined by the resultant direction of all of the components of said applied field.

5. A logical magnetic element comprising, a magnetic medium having an initial state of magnetization in a first direction, first, second and third channels located within said magnetic medium, each of said first, second and third channels being defined as an integral area exhibiting a substantailly lower coercive force characteristic than said medium, each of said first, second and third channels intersecting at a common point, means for nucleating within said first channel a domain of magnetization reversed in direction to the direction of said initial magnetization of said medium, means for applying a magnetic field to said first, second and third channels, said magnetic field being opposed in direction to the direction of said initial magnetization and sufficient in intensity to propagate said domain of reversed magnetization into one or the other of said second or third channels, fourth and fifth channels located within said magnetic medium adjacent to said intersection, each of said fourth and fifth channels being defined as an integral area exhibiting a substantially lower coercive force characteristic than said medium, said fourth and fifth channels being positioned with respect to said second and third channels such that the state of magnetization within said fourth and fifth channels determines which one of said second and third channels said reversed domain of magnetization is propagated into.

6. Apparatus in accordance with claim 1 and further including means for applying a propagating field to said second channel for propagating a state of reversed magnetization in a first direction along said second channel and wherein said means for applying a magnetic field to said first channel can be operated to provide in said first channel a state of magnetization polarized in said first direction for inhibiting the propagation of said state of reversed magnetization within said second channel.

References Cited

UNITED STATES PATENTS

| | | | |
|---|---|---|---|
| 3,172,089 | 3/1965 | Broadbent | 340—174 |
| 3,176,276 | 3/1965 | Smith | 340—174 |

BERNARD KONICK, *Primary Examiner.*

G. M. HOFFMAN, *Assistant Examiner.*